Jan. 24, 1956   M. B. LUCKER   2,732,042
AUTOMATIC ADJUSTER FOR DISC BRAKES AND THE LIKE
Filed Dec. 9, 1952   3 Sheets-Sheet 1

INVENTOR.
M. B. Lucker
BY Robert Cobb
Attorneys.

Jan. 24, 1956   M. B. LUCKER   2,732,042
AUTOMATIC ADJUSTER FOR DISC BRAKES AND THE LIKE
Filed Dec. 9, 1952   3 Sheets-Sheet 3

INVENTOR.
M. B. Lucker
BY
Robb & Robb
Attorneys.

United States Patent Office 2,732,042
Patented Jan. 24, 1956

2,732,042

AUTOMATIC ADJUSTER FOR DISC BRAKES AND THE LIKE

Millard B. Lucker, St. Joseph, Mich., assignor, by mesne assignments, to Lambert Brake Corporation, St. Joseph, Mich., a corporation of Michigan Application December 9, 1952, Serial No. 324,905

12 Claims. (Cl. 188—196)

The present invention relates to an automatic adjuster for compensating for wear of the friction faces in friction devices such as brakes, clutches and the like, and more specifically to an automatic adjuster which is particularly well-suited for use in disc brakes.

In its preferred embodiment, the invention is adapted for use with a disc brake of the type comprising a rotatable housing having a pair of opposed, radially extended, axially spaced friction faces adapted to be engaged by a pair of relatively rotatable and axially shiftable friction discs. This type of disc brake may be so constructed that the discs themselves are shifted rotatively so as to actuate the brake, and camming balls may be disposed between the discs to spread the same axially apart responsive to such relative rotation. In this type of construction, the adjuster means of this invention is adapted to be associated with the discs in such a manner as to permit free relative rotation of the discs in a direction to engage the brake, but to limit return or release movements of the discs to only that slight amount required to allow effective release of the brake and to afford free-running clearance for the brake.

On the other hand, the disc brake or friction device may be so constructed as to have one of the opposed faces of the brake housing or member to be braked shiftable towards and away from the other to engage the brake discs, and in such a construction, the adjuster of this invention is utilized to limit release movements of the opposed braking faces to only that slight amount required to allow free rotation of the discs relative to each other.

Self-adjusters or automatic adjusters have been utilized heretofore, but it is a primary object of the present invention to provide an automatic adjuster of this general type, but of an improved form.

In accordance with the foregoing objective, the present adjuster preferably comprises a pair of opposed spaced abutments or lugs which are preferably integrally formed on one adjustable part of a brake or the like, a bracket or carrier member which may be secured to an adjacent, relatively movable brake part, said bracket projecting into the space between the abutments aforesaid and supporting a plurality of wedge elements which are so arranged as to be freely shiftable in one direction responsive to thrusts from one of said abutments or lugs against one of said wedge elements, but so as to positively prevent return movement of the brake part having the lugs, responsive to abutting engagement of the other lug with this just-mentioned wedge element.

Another object is to provide an automatic adjuster, according to the preceding objective, in which the abutments or lugs are spaced apart a slightly greater distance than the length of the respective wedge elements with which they are engageable, whereby a constant release or running clearance of the brake is maintained.

An additional object is to provide an adjuster of the aforesaid type, which includes means for preventing retrograde movement of the wedge elements responsive to vibration or shock which might otherwise cause the wedge elements to slip. In attaining this objective, a spring-pressed member is preferably utilized to resiliently bias the wedge elements into tight wedging engagement with each other.

A further object is to provide an adjuster of the aforesaid type, which includes a pair of relatively shiftable wedge elements respectively having a pair of opposed faces disposed in opposed, spaced relation and disposed at an angle to the direction of movement of the wedge elements, and an anti-thrust plate which is held against movement in the direction of movement of said wedge elements, but which is shiftable in a direction normal to the direction of movement of said wedge elements responsive to such shifting movements of the wedge elements, said plate being disposed between said wedge elements for engagement with the respective angularly disposed faces thereof, one of said wedge elements constituting an adjuster wedge and being freely shiftable in one direction to release the wedging action of the wedge elements and the plate, and the other of said wedge elements constituting a follower wedge and being shiftable in the direction of the adjuster wedge to effect wedging action of the wedge elements and the plate so as to prevent retrograde movement thereof, but said follower wedge also being shiftable in the opposite direction to release the wedging engagement aforesaid so as to allow the wedge elements to be shifted back to their original positions.

A further object is to provide an automatic adjuster according to the preceding paragraph, in which the wedge elements and the plate are maintained in operative relation to each other by a bracket, this bracket and one of the wedge elements being provided with cooperative abutment means for limiting the maximum extent of adjustment of which the adjuster is capable.

Still another object is to provide an automatic adjuster which is extremely easy to operate and which is not materially affected by dust, oil deposits and the like, but which is strong, durable, and simple in construction.

Other objects, advantages and features of the present invention will hereinafter be described or will become apparent to those skilled in the art, and the novel features thereof will be defined in the appended claims.

In the drawings:

Fig. 7 is a view in elevation of the bracket member for maintaining the wedge elements and the anti-thrust plate in cooperative relation to each other; and Fig. 8 is a view in horizontal section, as taken on the line 8—8 of Fig. 7.

Figure 1:
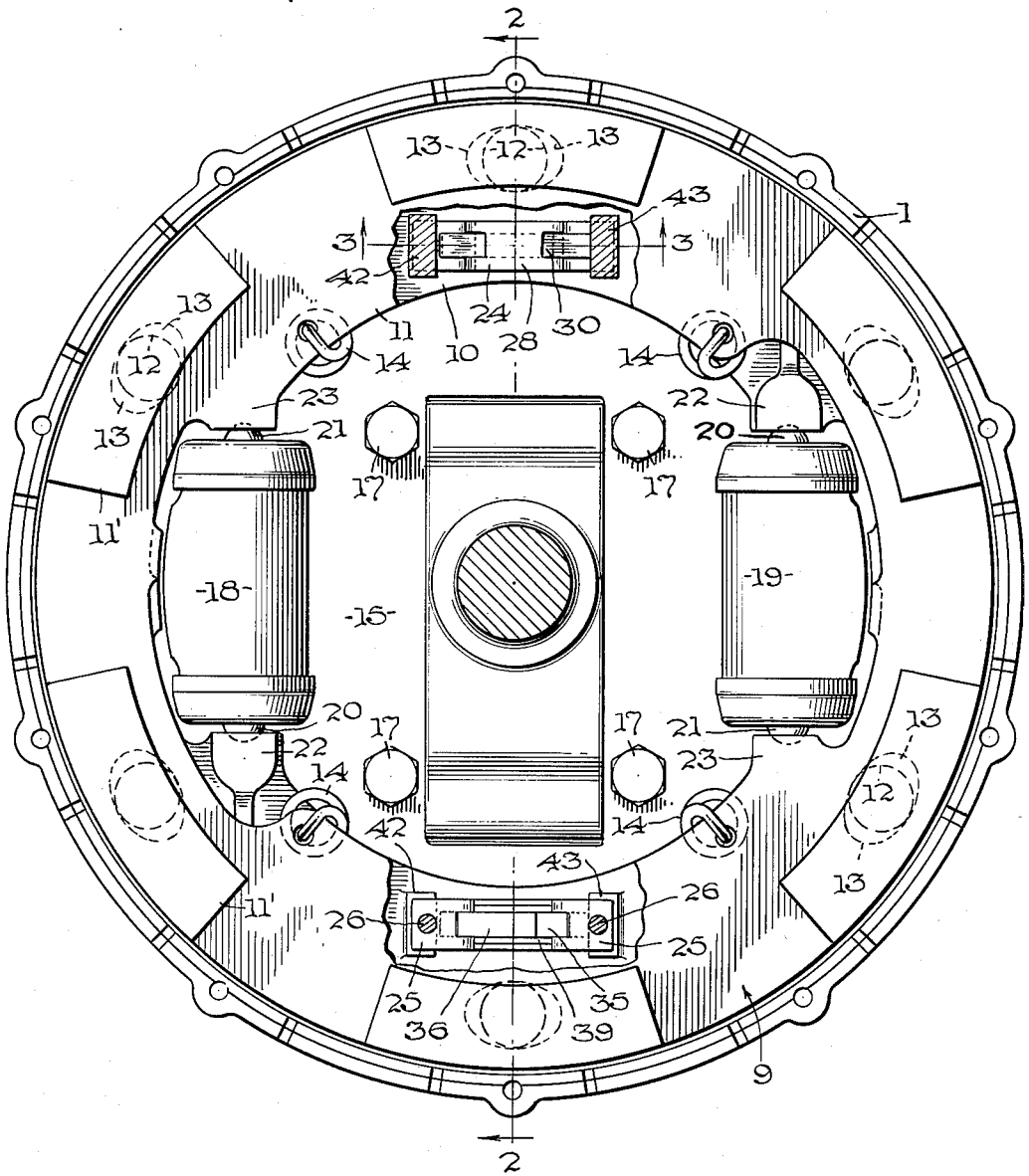
Fig. 1 is a view partly in section and partly in elevation, showing a double-disc brake assembly as applied to a front wheel-mounting of an automative vehicle, the outboard side of the housing being removed to expose the interior of the brake assembly, and the brake being provided with automatic adjusters of an improved form according to the present invention.

Like reference characters designate corresponding parts in the several views of the drawings, and it will be understood that while the adjuster of this invention is shown in association with a disc brake of a specific type, it is not limited to such use, but may be availed of in other specific forms of brakes, clutches, or in any location when it is desired to adjust the relative positions of a pair of adjacent relatively shiftable members.

Figure 2:
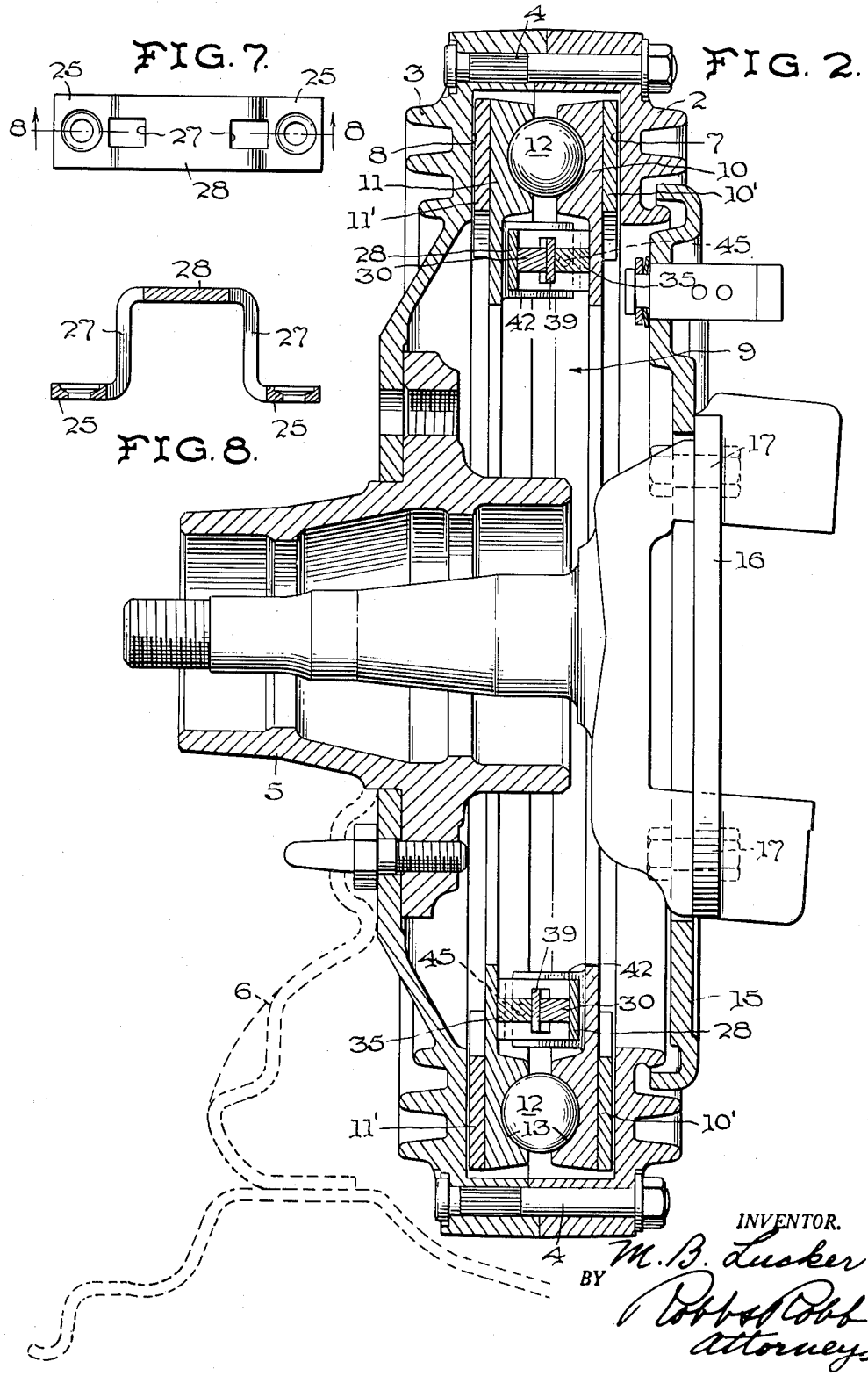
Fig. 2 is an enlarged view in vertical section, as taken on the line 2—2 of Fig. 1, but showing the outboard side of the housing in applied position, and showing a portion of a vehicle wheel in broken lines.

Referring first to Figs. 1 and 2, 1 generally denotes a two-part housing, the two parts 2 and 3 of which respectively constitute an inboard and an outboard housing section. Bolts 4 extend through abutting marginal flanges on the housing sections so as to secure the same together, and the housing 1 is adapted to be connected to a wheel mounting hub 5 of a vehicle wheel 6 for rotation therewith, as is customary.

When assembled, the inner faces of the housing 1 constitute a pair of axially spaced, opposed, radially extended friction or braking surfaces 7 and 8 adapted for cooperative braking engagement with an inner double-disc assembly generally designated 9. This double-disc assembly preferably comprises a pair of identical discs, designated respectively 10 and 11, arranged back-to-back, with a plurality of hardened balls 12 disposed therebetween and seating in opposed oppositely inclined ramped seats 13 formed in the inner faces of the discs. A plurality of tension springs 14 resiliently connect the discs together with the balls between the discs, and the force of the springs causes the discs to assume a normal position with the balls seating in the deepest part of the seats. Thus, it is seen that a unitary double-disc assembly is provided.

As is customary in this type of disc brake, the outer faces of the discs 10 and 11 are provided with suitable friction lining material segments 10' and 11', respectively. These lining segments are preferably bonded to the discs and are adapted for frictional engagement with the braking surfaces 7, 8 in the housing 1.

At the inboard side of the brake is a backing or adapter plate 15 which is suitably secured to the wheel mounting, as by means of a plate 16 secured to the axle assembly and a suitable number of bolts 17 which secure the adapter plate 15 to the plate 16. Fixedly mounted in diametrically opposite positions on the adapter plate 15 is a pair of actuators 18 and 19 of the fluid-pressure-operated type. These actuators each include a pair of opposed pistons (not shown) adapted to be shifted in opposite directions, and a pair of thrust pins 20 and 21 are swivelly mounted at one end on said pistons. The other end of each thrust pin 20 is engaged with a lug 22 on the inner periphery of the inboard disc 10, and the other end of each thrust pin 21 is engaged with a lug 23 on the inner periphery of the outboard disc 11. The lugs 22 and 23 on the respective discs are disposed in diametrically opposite positions, and each lug 22 is spaced from and in opposed relation to a lug 23, whereby, upon the application of fluid under pressure to the actuators 18 and 19, the discs 10 and 11 will rotate slightly relative to each other. Responsive to such relative rotation of the discs, the balls 12 will spread the discs axially apart into frictional engagement with the braking surfaces 7 and 8 of the housing 1.

Suitable means (not shown) is also provided to anchor one disc or the other, depending upon the direction of rotation of the housing 1, while the other disc continues to shift rotatively responsive to continue fluid pressure and responsive to the drag torque imparted thereto by the housing 1. Such anchoring of the discs allows self-energization of the brake, as is customary in this type of disc brake.

As the friction lining segments 10' and 11' wear down, it is highly desirable to maintain the running or release clearance between the discs and the drum, constant throughout the life of the friction lining material. This result has previously been accomplished by means of automatic self-adjusters, and according to the salient features of this invention, I provide such an adjuster of an improved form.

Figure 3:
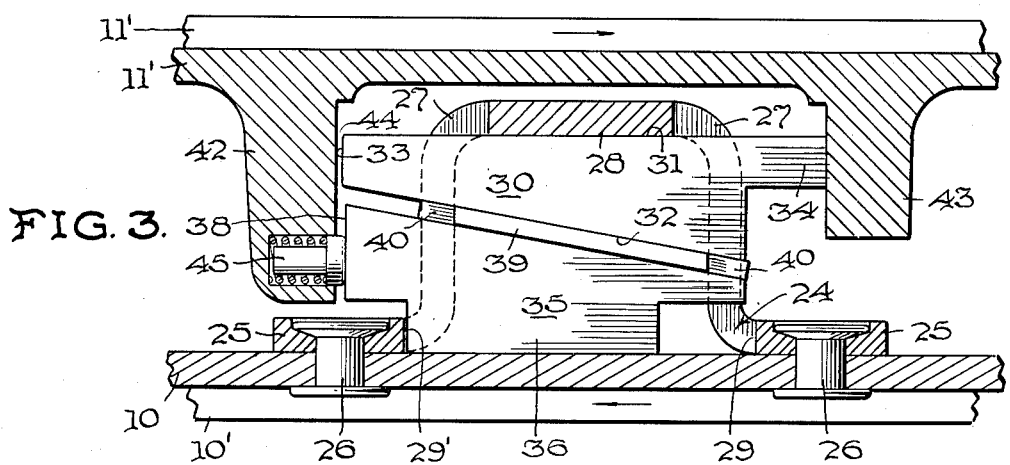
Fig. 3 is an enlarged, fragmentary view, in horizontal section, of an adjuster embodying the present invention, as taken on the line 3—3 of Fig. 1, the adjuster parts being shown in their positions prior to making any adjustment.
Figure 4:
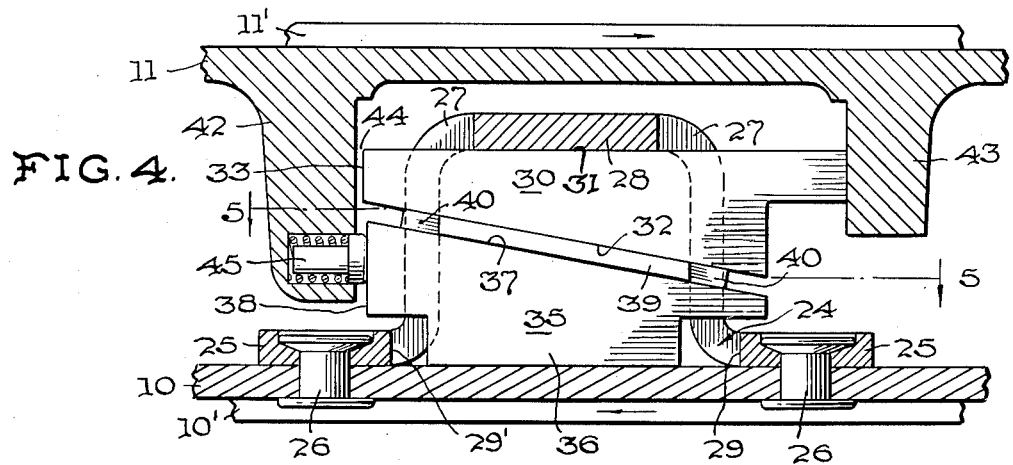
Fig. 4 is view similar to that of Fig. 3, but showing the adjuster parts in their positions after automatically adjusting the brake to an extent equal to about one-half of its over-all range of adjustment.
Figure 5:
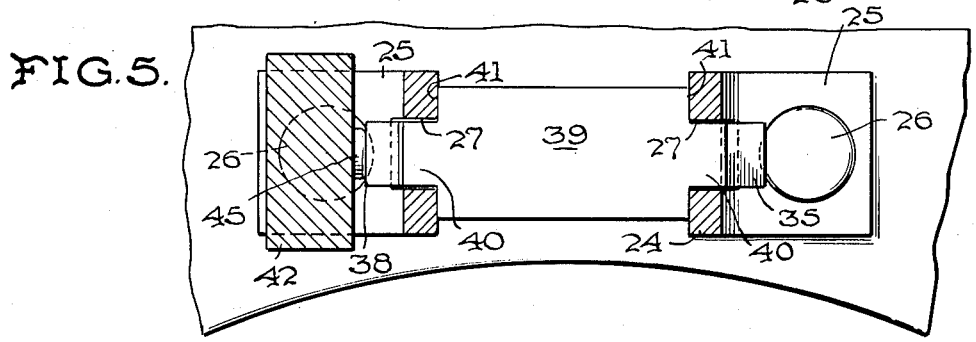
Fig. 5 is a view in horizontal section, as taken on the line 5—5 of Fig. 4.
Figure 6:
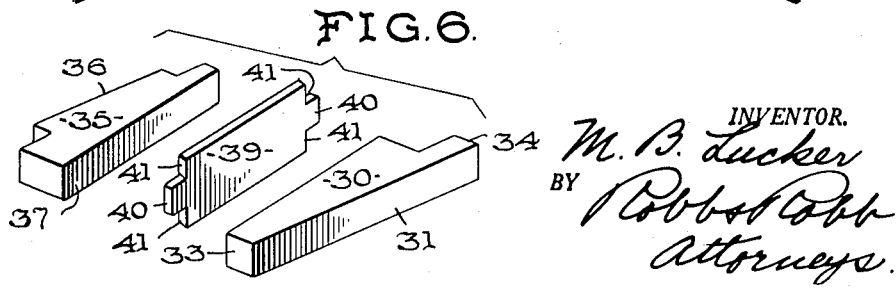
Fig. 6 is an exploded view in perspective of the wedge elements and the anti-thrust plate.

In its preferred embodiment, my new self-adjuster comprises a substantially U-shaped bracket 24 having its end portions turned outwardly, as at 25, so as to be secured to a member such as the inboard disc 10, as in Figs. 3, 4 and 5 of the illustrated disc brake. Suitable means for securing the ends 25 of the bracket to the disc 10, such as rivets 26, are employed. The opposite sides of the bracket 24 are cut out or slotted, as at 27, so as to leave a retaining wall 28 at the base of the U-shaped bracket, and so as to provide stop shoulders or abutments 29, 29' adjacent to the ends 25 thereof.

Mounted in said bracket 24 so as to be slidable in the cut-outs 27 is an adjuster wedge 30 having a face 31 disposed in parallel, contiguous relation to the inner face of the retaining wall 28. The face 32 of wedge 30, opposite face 31, is disposed at an angle thereto, thus providing a small end 33 on the wedge 30. The end of wedge 30 opposite the end 33 thereof is cut away to provide a relatively small stop projection 34.

A second wedge element 35, which shall be hereinafter referred to as a follower wedge, is also slidably disposed in the cut-outs 27. This follower wedge has a portion 36 disposed between the ends 25 of the bracket 24 and being of a length less than the distance between the stop shoulders 29, 29' of the bracket 24. As will be hereinafter more fully described, the difference between the length of the portion 36 of wedge 35 and the distance between the stop shoulders 29, 29' is predetermined so as to limit the over-all adjusting capacity of my improved adjuster. The wedge 35 is also provided with an angularly disposed face 37 parallel to the face 32 of wedge 30. The end 33 of wedge 30 overhangs the end 38 of wedge 35; that is, the extreme end faces of the ends 33, 38 are not in planar relation, for a reason which will hereinafter appear.

Interposed between the wedges 30 and 35, is an antithrust plate 39, the ends of which are each formed with a tongue portion 40 which projects into the cut-outs 27 of the bracket 24, and providing shoulders 41 on the plate 39, which shoulders engage the inside walls of the bracket 24. The plate 39 is free for movement towards and away from the retaining wall 28 of bracket 24, but it is restrained by the shoulders 41 against movement in the direction of longitudinal movements of the wedge elements, thereby preventing thrust from being transmitted from one wedge to the other in any direction other than one normal to the wall 28 which is contacted by the face 31 of wedge 30, and normal to the body of the disc to which the bracket 24 is secured and with which the portion 36 of wedge 35 is in contact.

A pair of opposed, spaced lugs or abutments 42, 43 is carried by a member which is movable relative to the bracket 24, which member, in the illustrations, is constituted by the outboard disc 11, as in Figs. 3, 4 and 5 of the illustrated brake. The distance between these lugs 42, 43 is predeterminedly greater than the over-all length of the adjuster wedge 30, whereby, normally, there will be a slight space 44 between the end 33 of wedge 30 and the lug 42. In a disc brake of the type illustrated, this space 44 determines the release or running clearance between the braking surfaces of the housing and the cooperative faces of the discs, as will hereinafter become fully apparent. Moreover, the return springs 14 and the balls 12 of this type of brake, will maintain the discs 10 and 11 shifted in such a direction that normally, when the brake is released, the lug 43 will be maintained in contact with the stop projection 34 on wedge 30.

Resilient means is preferably provided to continuously bias the follower wedge 35 in a direction away from lug 42, and preferably said means comprises a spring-pressed button 45 which projects from a suitable recess in the lug 42 into contact with the end 38 of wedge 35. This button 45 thus maintains the follower wedge 35 constantly in engagement with the anti-thrust plate 39 which is in turn maintained in engagement with the adjuster wedge 30.

Accordingly, due to the angular relation of the contacting faces of the wedge elements and the anti-thrust plate, the adjuster wedge 30 is free to shift to the right, as seen in Figs. 3, 4 and 5, but a positive wedging action of the wedges 30, 35 against the retaining wall 28 and the body of the disc 10, respectively, prevents movement of the adjuster wedge 30 to the left as seen in these views.

It should be understood that the adjuster shown in Figs. 3, 4 and 5, is the uppermost adjuster shown in Figs. 1 and 2, and, therefore, in the case of the lowermost adjuster of Figs. 1 and 2, the bracket 24 is mounted on the outboard disc 11 and the lugs 42 are carried by the inboard disc 10. In other words, the lower adjuster is merely rotated on its major axis 180° from the upper adjuster.

The operation of the adjuster of this invention is as follows:

When fluid under pressure is forced into the actuators 18 and 19, the discs 10 and 11 will be caused to shift rotatively or angularly in opposite directions, these movements being designated by the arrows on the discs of Figs. 3 and 4. The balls 12 between the discs will effect axial spreading of the discs into engagement with the braking surfaces 7 and 8 of the housing 1, and the inner disc assembly, as a whole, is preferably freely floating about the actuators, and may "clock" with the housing until one disc or the other anchors, as hereinbefore described, to effect self-energization of the brake. In the case of new friction linings 10' and 11', or linings which have not worn down to any material extent, the wedge elements 30 and 35 will remain in the relative positions shown in Fig. 3, and the space 44 will allow the discs to shift rotatively relative to each other a sufficient distance as to fully apply the brake. However, as the friction lining wears down, the lug 42 will butt up against the end 33 of the adjuster wedge 30, thereby shifting the same to the right until such time as the discs attain a maximum frictional engagement with the housing 1. Such shifting movement of the adjuster wedge 30 releases the wedging action of the wedge elements, but the resilient means or button 45 will constantly urge the follower wedge in the direction of movement of the adjuster wedge. Accordingly, the follower wedge constantly shifts the anti-thrust plate 39 towards the wedge 30, and immediately upon cessation of the shifting movement of the adjuster wedge 30 and upon release of the brake-operating fluid pressure, the lug 43, which will have shifted away from the stop projection 34 a distance corresponding to space 44, will come back into engagement with the stop projection 34 on the wedge 30, thus binding the face 31 against the retaining wall 28 of bracket 24, and also binding the portion 36 of wedge 35 against the body of disc 10, with a positive and powerful wedging action.

After some adjustment has taken place, the portion 36 of wedge 35 will be in the position shown in Fig. 4, i. e., the portion 36 will be located in a position somewhere intermediate the stop shoulders 29, 29' of the bracket 24, as would be determined by the extent of wear of the friction linings.

As wear of the linings continues, the portion 36 of wedge 35 will progressively shift further to the right, as seen in Fig. 4, until ultimately it butts up against the stop shoulder 29 of the bracket 24. At this time, further adjustment of the brake is prohibited, and thus, continued wear of the brake lining will result in a progressive loss of pedal which will act as a warning that the linings should be replaced or renewed, before any damage to the braking surfaces 7, 8 in the housing occurs.

To release the adjuster, that is, to return the adjuster wedge 30 to the position shown in Fig. 3, from the position shown in Fig. 4 or any other adjusted position, it is only necessary to shift the follower wedge 35 to the left, as seen in Fig. 4, against the pressure of the spring-pressed element 45. This releases the wedging engagement between the wedge elements 30 and 35 and the anti-thrust plate 39, so that the wedge elements freely slide towards abutment 42 until the left-hand end of the portion 36 of wedge 35, as seen in Fig. 3, abuts the stop portion 29' of the bracket 24. This shifting movement of the follower wedge 35 may be accomplished by means of any suitable tool, such as a screw driver or the like, which is small enough to fit between the abutment 43 and the end 25 of the bracket 24, to effect end-wise thrust on the wedge 35.

Moreover, when a brake equipped with an adjuster or adjusters embodying the present invention is initially assembled on a vehicle, or when new friction lining material has been applied to such a brake, no initial adjustment of the new or repaired brake is necessary. Upon the initial application of the brakes, such new or repaired brakes will automatically be adjusted to a proper operating condition, with only that slight amount of release clearance necessary to free-running of the brake housing, as determined by the difference between the length of the adjuster wedge 30 and the distance between the spaced abutments 42, 43, as represented by the clearance 44.

While the specific details of the preferred form of this invention have been herein shown and described, it is not confined to such details, since changes and alterations may be resorted to without departing from the spirit thereof, as defined in the appended claims.

I claim:

1. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, including a longitudinally extended wedge element disposed for engagement at its opposite ends with said abutments, a cooperative relatively movable wedge element, an anti-thrust plate between said wedge elements, and means normally maintaining said wedge elements and said plate in wedging engagement with one another, with the first-mentioned wedge element engaged with at least one of said abutments.

2. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising an adjuster wedge element having a face disposed at an angle to the direction of movement of said wedge element, a follower wedge element having a face disposed in parallel spaced relation to the angularly disposed face aforesaid of said adjuster wedge element, and anti-thrust means interposed between said wedge elements.

3. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising an adjuster wedge element having a face disposed at an angle to the direction of movement of said wedge element, a follower wedge element having a face disposed in parallel spaced relation to the angularly disposed face aforesaid of said adjuster wedge element, and anti-thrust means interposed between said wedge elements, said adjuster wedge element being of a length slightly less than the distance between said abutments.

4. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising an adjuster wedge element having a face disposed at an angle to the direction of movement of said wedge element, a follower wedge element having a face disposed in parallel spaced relation to the angularly disposed face aforesaid of said adjuster wedge element, and anti-thrust means interposed between said wedge elements, said follower wedge element and the supporting means aforesaid being provided with cooperative stop means to limit movement of said follower wedge element in one direction.

5. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising an adjuster wedge element having a face disposed at an angle to the direction of movement of said wedge element, a follower wedge element having a face disposed in parallel spaced relation to the angularly disposed face aforesaid of said adjuster wedge element, and anti-thrust means interposed between said wedge elements, said supporting means comprising a substantially U-shaped bracket having its opposed side walls cut out, and said wedge elements being mounted in said bracket and having their opposite ends projecting through said cut-outs for engagement with said abutments.

6. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising an adjuster wedge element having a face disposed at an angle to the direction of movement of said wedge element, a follower wedge element having a face disposed in parallel spaced relation to the angularly disposed face aforesaid of said adjuster wedge element, and anti-thrust means interposed between said wedge elements, said anti-thrust means comprising a flat plate, said supporting means and said plate having cooperative means for preventing movements of said plate in the direction of the shifting movement of said wedge elements while allowing wedging movements of said wedge elements.

7. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said wedge means comprising a pair of oppositely tapered wedges, one of said wedges having its opposite ends disposed for abutting engagement with the abutments, and the other of said wedges and one of said abutments having opposed, spaced portions, and resilient means interposed between said opposed, spaced portions for biasing said latter wedge into a wedging position relative to the first-mentioned wedge.

8. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said supporting means comprising a bracket having a pair of opposed side walls having openings therethrough, a retaining end wall interconnecting said side walls, the end of said bracket opposite said retaining wall being open, and said wedge means comprising a pair of oppositely tapered wedges shiftably mounted in said bracket and having their opposite ends projecting through the openings in the side walls thereof, one of said wedges having a face in engagement with said retaining wall, and the other wedge having a portion adapted to engage one of the shiftable members aforesaid through the open end of said bracket, and anti-thrust means disposed between said wedges.

9. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said supporting means comprising a bracket having a pair of opposed side walls having openings therethrough, a retaining end wall interconnecting said side walls, the end of said bracket opposite said retaining wall being open, and said wedge means comprising a pair of oppositely tapered wedges shiftably mounted in said bracket and having their opposite ends projecting through the openings in the side walls thereof, one of said wedges having a face in engagement with said retaining wall, and the other wedge having a portion adapted to engage one of the shiftable members aforesaid through the open end of said bracket, and anti-thrust means disposed between said wedges, said anti-thrust means comprising a plate having shoulder portions thereon in engagement with said side walls of the bracket to limit said plate to movements towards and away from said retaining wall, and said plate having tongue portions projecting into the opening through the side walls of said bracket.

10. An automatic adjuster of the class described adapted to adjust the relative positions of a pair of relatively shiftable members, comprising a pair of spaced relatively fixed abutments, supporting means disposed intermediate said abutments, and one-way adjusting means shiftably carried by said supporting means and disposed for engagement at the opposite ends thereof with said abutments for allowing said abutments to be shifted in one direction relative to said supporting means but prohibiting retrograde movement thereof, said one-way adjusting means comprising cooperative wedge means, said supporting means comprising a bracket having a pair of opposed side walls having openings therethrough, a retaining end wall interconnecting said side walls, the end of said bracket opposite said retaining wall being open, and said wedge means comprising a pair of oppositely tapered wedges shiftably mounted in said bracket and having their opposite ends projecting through the openings in the side walls thereof, one of said wedges having a face in engagement with said retaining wall, and the other wedge having a portion adapted to engage one of the shiftable members aforesaid through the open end of said bracket, and anti-thrust means disposed between said wedges, said one of said abutments being provided with resilient means acting on one of said wedges to bias the same into a wedging position relative to the other of said wedges.

11. An automatic adjuster of the class described for adjusting the relative positions of a pair of relatively movable elements, comprising supporting means, a pair of spaced relatively fixed abutments respectively disposed on opposite sides of said supporting means, said supporting means and said abutments being shiftable relative to each other, an adjuster wedge shiftably carried by said supporting means and having its opposite ends disposed for abutting engagement with said abutments so as to be shiftable endwise in one direction responsive to shifting movement in one direction of said abutments relative to said supporting means, a follower wedge shiftably carried by said supporting means and having its opposite ends disposed inwardly from the ends of said adjuster wedge, an anti-thrust member disposed between said wedges to prevent the transmission of endwise movement of said adjuster wedge to said follower wedge, and resilient means interposed between one of said abutments and one end of the follower wedge for biasing the follower wedge in the direction of movement of said adjuster wedge to effect wedging engagement of said wedges and said anti-thrust member and thereby preclude movement of said abutments in the other direction relative to said supporting means.

12. An automatic adjuster of the class described for adjusting the relative positions of a pair of relatively movable elements, comprising supporting means, a pair of spaced relatively fixed abutments respectively disposed on opposite sides of said supporting means, said supporting means and said abutments being shiftable relative to each other, an adjuster wedge shiftably carried by said supporting means and having its opposite ends disposed for abutting engagement with said abutments so as to be shiftable endwise in one direction responsive to shifting movement in one direction of said abutments relative to said supporting means, a follower wedge shiftably carried by said supporting means and having its opposite ends disposed inwardly from the ends of said adjuster wedge, an anti-thrust member disposed between said wedges to prevent the transmission of endwise movement of said adjuster wedge to said follower wedge, and resilient means interposed between one of said abutments and one end of the follower wedge for biasing the follower wedge in the direction of movement of said adjuster wedge to effect wedging engagement of said wedges and said anti-thrust member and thereby preclude movement of said abutments in the other direction relative to said supporting means, said follower wedge having a portion extending outwardly from the supporting means so as to be engageable by an operating tool to shift the follower wedge in a direction opposed to the resilient means aforesaid to release wedging engagement of the wedges and thereby render the adjuster wedge shiftable in the other direction.

References Cited in the file of this patent

UNITED STATES PATENTS

| | | |
|---|---|---|
| 2,069,831 | Hirschman et al. | Feb. 9, 1937 |
| 2,276,206 | Klaue | Mar. 10, 1942 |
| 2,607,442 | Lucker et al. | Aug. 19, 1952 |

FOREIGN PATENTS

| | | |
|---|---|---|
| 976,748 | France | Nov. 1, 1950 |
| 829,259 | Germany | Jan. 24, 1952 |